United States Patent
Hisano

(10) Patent No.: US 9,513,137 B2
(45) Date of Patent: Dec. 6, 2016

(54) AREA MAP PROVISION SYSTEM, TERMINAL DEVICE, AND SERVER DEVICE

(71) Applicant: DENSO CORPORATION, Kariya, Aichi-pref. (JP)

(72) Inventor: Takuya Hisano, Ibi-gun (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 14/424,119

(22) PCT Filed: Oct. 4, 2013

(86) PCT No.: PCT/JP2013/005943
§ 371 (c)(1),
(2) Date: Feb. 26, 2015

(87) PCT Pub. No.: WO2014/061224
PCT Pub. Date: Apr. 24, 2014

(65) Prior Publication Data
US 2015/0300837 A1 Oct. 22, 2015

(30) Foreign Application Priority Data
Oct. 15, 2012 (JP) .................... 2012-228181

(51) Int. Cl.
*G01C 21/36* (2006.01)
*G06Q 30/02* (2012.01)
(Continued)

(52) U.S. Cl.
CPC ....... *G01C 21/3644* (2013.01); *G01C 21/3679* (2013.01); *G01C 21/3682* (2013.01);
(Continued)

(58) Field of Classification Search
CPC .......... G01C 21/3644; G01C 21/3682; G06Q 30/0266; G08G 1/0112; G08G 1/0141

USPC ......................................................... 701/454
See application file for complete search history.

(56) References Cited

U.S. PATENT DOCUMENTS 9,196,157 B2* 11/2015 Hardin ................... G01C 21/20
9,280,894 B2* 3/2016 Chapman ........... G01C 21/3691
(Continued)

FOREIGN PATENT DOCUMENTS

JP 2005-149481 A 6/2005
JP 2008-128659 A 6/2008
(Continued)

OTHER PUBLICATIONS

International Search Report of the International Searching Authority mailed Oct. 29, 2013 in the corresponding PCT application No. PCT/JP2013/005943 (with English translation).
(Continued)

*Primary Examiner* — Fadey Jabr
*Assistant Examiner* — Yazan Soofi
(74) *Attorney, Agent, or Firm* — Posz Law Group, PLC

(57) ABSTRACT

An area map provision system includes a terminal device and a server device communicating with each other. The server device includes an information collection unit collecting travel information related to travel of each vehicle, and a concentration degree determination unit determining a concentration degree of people at each point on a map based on the travel information. The terminal device or the server device includes a hotspot determination unit determining hotspots, each of which has the concentration degree equal to or higher than a threshold value, a recommendation facility search unit searching for recommendation facilities determined based on preferences of a target user, and an area map generation unit, when at least one of search regions defined with respective hotspots as reference points includes at least two recommendation facilities, generating an area map by including text or image to distinguishably represent the at least two recommendation facilities.

14 Claims, 7 Drawing Sheets

(51) Int. Cl.
*G08G 1/01* (2006.01)
*G08G 1/0968* (2006.01)

(52) U.S. Cl.
CPC ......... *G06Q30/0266* (2013.01); *G08G 1/0112* (2013.01); *G08G 1/0141* (2013.01); *G08G 1/096811* (2013.01); *G08G 1/096844* (2013.01)

(56) References Cited

U.S. PATENT DOCUMENTS

| | | |
|---|---|---|
| 2002/0026289 A1 | 2/2002 | Kuzunuki et al. |
| 2005/0144049 A1 | 6/2005 | Kuzunuki et al. |
| 2005/0177303 A1 | 8/2005 | Han |
| 2015/0070193 A1* | 3/2015 | Anschutz ............. H04W 8/005 340/903 |
| 2015/0127244 A1* | 5/2015 | Fowe ..................... G08G 1/093 701/117 |

FOREIGN PATENT DOCUMENTS

| | | |
|---|---|---|
| JP | 2009-264762 A | 11/2009 |
| JP | 2010-266333 A | 11/2010 |
| JP | 2012-098128 A | 5/2012 |
| JP | 2012-208030 A | 10/2012 |

OTHER PUBLICATIONS

Written Opinion of the International Searching Authority mailed Oct. 29, 2013 in the corresponding PCT application No. PCT/JP2013/005943 (with English translation).

* cited by examiner

AREA MAP PROVISION SYSTEM, TERMINAL DEVICE, AND SERVER DEVICE

CROSS REFERENCE TO RELATED APPLICATIONS

The present disclosure is a U.S. national stage application of PCT/JP2013/005943 filed on Oct. 4, 2013 and is based on Japanese Patent Application No. 2012-228181, filed on Oct. 15, 2012, the disclosures of which are incorporated herein by reference.

TECHNICAL FIELD

The present disclosure relates to an area map provision system, and a terminal device and a server device that are included in the area map provision system.

BACKGROUND ART

Patent Literature 1 discloses an information provision system to enable guidance of actually popular facilities. In this information provision system, even though a user does not designate a reference facility, a search is conducted to search for a facility at which the number of visitors is larger than a previously set threshold value. Then, the search results are rearranged in accordance with a predetermined condition such as the number of visitors, and displayed on a display unit. This suppresses the user's labor to extract candidates of visiting destination facilities, and enables guidance to actually popular facilities.

However, the technique disclosed in Patent Literature 1 is merely displaying facility information on several facilities satisfying predetermined conditions among facilities at which the number of visitors is large. When the user actually visits one of these facilities and the facility does not suit the user's actual preferences, the travel ends in vain.

PRIOR ART LITERATURE

Patent Literature

Patent Literature 1: JP 2008-128659 A

SUMMARY OF INVENTION

In view of the foregoing difficulties, it is an object of the present disclosure to provide an area map provision system, a terminal device, and a server device, each of which is capable of guiding a user to an actually popular facility and reduces manipulations by the user for extracting candidates of a visit destination and improves a possibility of visiting a facility that suit actual tastes of the user.

According to a first aspect of the present disclosure, an area map provision system includes a terminal device and a server device communicating with the terminal device. The server device includes an information collection unit and a concentration degree determination unit. The information collection unit collects travel information related to a travel of each of multiple vehicles. The concentration degree determination unit determines, based on the travel information, a concentration degree indicating a degree of a concentration of people at each of multiple points on a map. One of the terminal device or the server device includes a hotspot determination unit, a recommendation facility search unit, and an area map generation unit. The hotspot determination unit determines a part of the points, each of which has the concentration degree equal to or higher than a threshold value, as multiple hotspots. Multiple search regions are defined on the map with respective hotspots as reference points. The recommendation facility search unit searches the map for multiple recommendation facilities determined based on preferences of a target user of the terminal device. The area map generation unit, when at least one of the search regions includes at least two of the recommendation facilities, generates a map of the at least one of the search regions as an area map by including at least one of a text or an image to distinguishably represent each of the at least two of the recommendation facilities from the recommendation facilities other than the at least two of the recommendation facilities. The terminal device includes a display unit that controls a display device to display the area map of the at least one of the search regions.

With the above system, a guidance to an actually popular facility can be carried out and manipulations performed by the user for extracting candidates of a visit destination are reduced, and a possibility of visiting a facility that suit actual tastes of the user can be improved.

According to a second aspect of the present disclosure, an area map provision system includes a terminal device and a server device communicating with the terminal device. The server device includes an information collection unit, a concentration degree determination unit, and a representative value calculation unit. The information collection unit collects travel information related to a travel of each of multiple vehicles. The concentration degree determination unit determines, based on the travel information, a concentration degree indicating a degree of a concentration of people at each of multiple points on a map. The representative value calculation unit calculates a representative value of the concentration degrees at respective points by statistically processing the concentration degrees at respective points. The concentration degrees at respective points are successively determined by the concentration degree determination unit. One of the terminal device or the server device includes a hotspot determination unit, a recommendation facility search unit, and an area map generation unit. The hotspot determination unit determines a part of the points, each of which has the concentration degree equal to or higher than a threshold value and is also equal to or higher than a value, which is greater than the representative value by a predetermined value, as multiple hotspots, multiple search regions being defined on the map with respective hotspots as reference points. The recommendation facility search unit searches the map for multiple recommendation facilities determined based on preferences of a target user of the terminal device. The area map generation unit, when one of the search regions includes at least two of the recommendation facilities, generates a map of the one of the search regions by including at least one of a text or an image to distinguishably represent each of the at least two of the recommendation facilities from the recommendation facilities other than the at least two of the recommendation facilities. The terminal device includes a display unit that controls a display device to display the area map of the one of the search regions.

With the above system, a guidance to an actually popular facility can be carried out and manipulations performed by the user for extracting candidates of a visit destination are reduced, and a possibility of visiting a facility that suit actual tastes of the user can be improved.

According to a third aspect of the present disclosure, a terminal device that is used as the terminal device of the area map provision system according to the first aspect or according to the second aspect is provided.

With the above device, advantages similar to the advantages provided by the area map provision system according to the first aspect or according to the second aspect are provided.

According to a fourth aspect of the present disclosure, a server device that is used as the server device of the area map provision system according to the first aspect or according to the second aspect is provided.

With the above device, advantages similar to the advantages provided by the area map provision system according to the first aspect or according to the second aspect are provided.

BRIEF DESCRIPTION OF DRAWINGS

The above and other objects, features and advantages of the present invention will become more apparent from the following detailed description made with reference to the accompanying drawings. In the drawings.

EMBODIMENTS FOR CARRYING OUT INVENTION

The following will describe embodiments of the present disclosure with reference to the drawings.

First Embodiment

Figure 1:
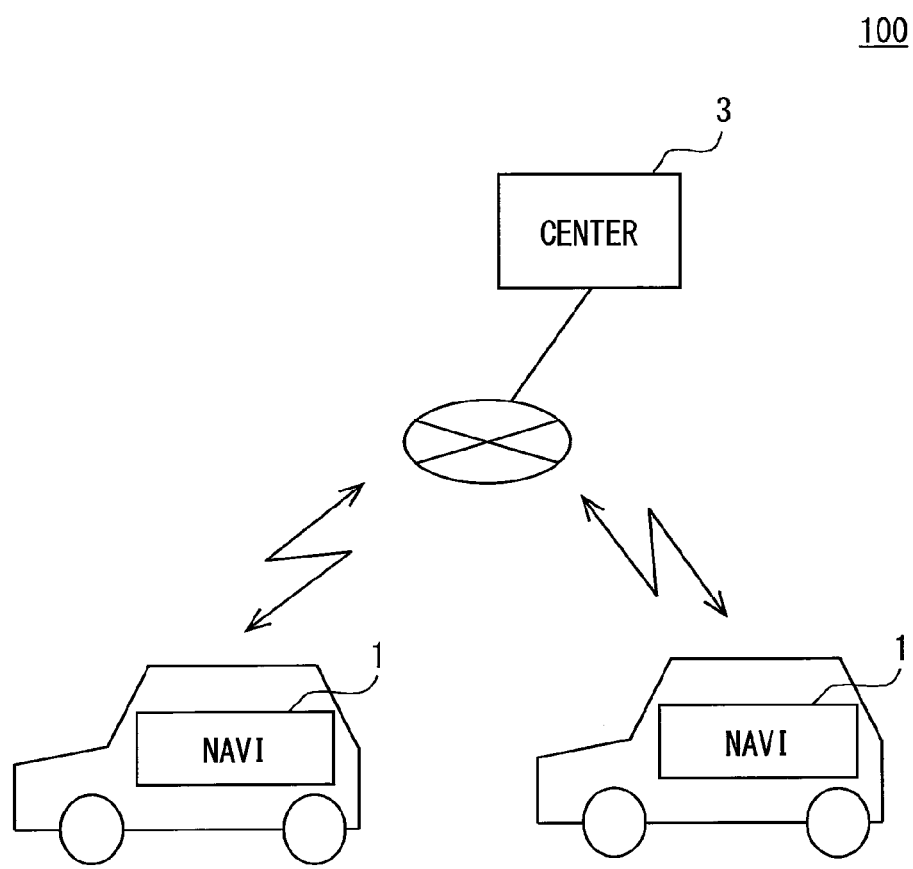
FIG. 1 is a block diagram showing an example of a schematic configuration of an area map provision system according to an embodiment of the present disclosure.

FIG. 1 is a block diagram showing an example of a schematic configuration of an area map provision system 100 to which the present disclosure is applied. The area map provision system 100 shown in FIG. 1 includes a navigation device (NAVI) 1 and a center (CENTER) 3.

The navigation device 1 has an area map provision related function. The area map provision related function will be described later in addition to the publicly known navigation functions, such as route search and route guidance. A schematic configuration of the navigation device 1 will be described with reference to FIG. 2. The navigation device 1 corresponds to a terminal device.

Figure 2:
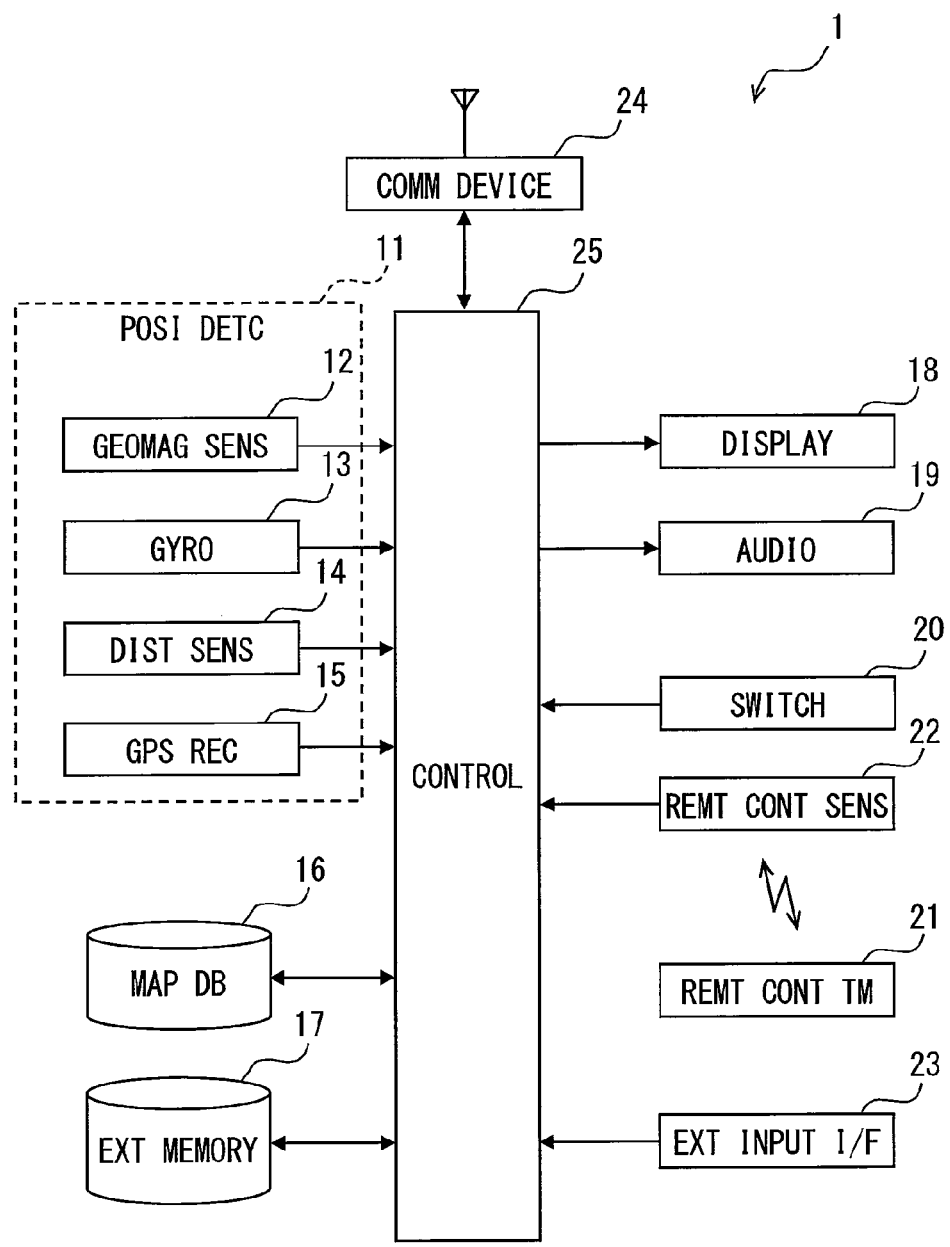
FIG. 2 is a block diagram showing an example of a schematic configuration of a navigation device included in the area map provision system.

As shown in FIG. 2, the navigation device 1 includes a position detector (POSI DETC) 11, a map database (MAP DB) 16, an external memory (EXT MEMORY) 17, a display device (DISPLAY) 18, an audio output device (AUDIO) 19, an operation switch group (SWITCH) 20, a remote control terminal (REMT CONT TM) 21, a remote control terminal sensor (REMT CONT SENS) 22, an external input interface (EXT INPUT I/F) 23, a communication device (COMM DEVICE) 24, and a control device (CONTROL) 25. Hereinafter, the remote control terminal 21 is also referred to as remote controller.

The position detector 11 includes a geomagnetic sensor (GEOMAG SENS) 12, a gyroscope (GYRO) 13, a vehicle speed (distance) sensor (DIST SENS) 14 that calculates a travel distance, and a GPS receiver (GPS REC) 15 used for receiving GPS (Global Positioning System) radio waves to detect a position of a subject device based on the radio waves from a satellite. All of these sensor elements of the position detector 11 are publicly known. The position detector 11 successively detects a current position of the subject device. For example, the current position of the subject device is represented by latitude and longitude coordinates.

Above-described sensor elements have respective errors, which have different properties from one another. Thus, above-described sensor elements are used in a complementary manner. The position detector 11 may include a part of the above sensor elements in accordance with accuracy of the respective sensors. When the navigation device 1 is used in a vehicle, the position detector 11 successively detects the current position of the vehicle (hereinafter, referred to as "vehicle position"). Hereinafter, a description will be made on the assumption that the position detector 11 successively detects the vehicle position.

The map DB 16 stores road map data, POI (Points of Interest) data of various facilities, and the like. The road map data includes road data including node data and link data, background data indicating topographic features and the like, character data to display geographic names and the like. The POI data is data indicating name, address, position and type of a facility.

For example, the POI position data is represented by latitude and longitude coordinates. Further, for example, the POI type may include a store, a restaurant, a cafe, a Japanese style bar, a convenience store, a drug store, and the like. Further, other than the store, the POI type may include a coin operated parking space, a hospital, and the like.

The data stored in the map DB 16 may be downloaded by the control device 25 from a network such as the Internet through a not-shown communication I/F. The data in the map DB 16 may also be previously stored. As the map DB 16, for example, a storage medium such as a CD-ROM, a DVD-ROM, a memory card, an HDD, or the like, may be used.

The external memory 17 is a large capacity storage device, such as a writable HDD. For example, the external memory 17 stores a large amount of data and data need to be maintained without deletion when the power source is turned off. The external memory 17 may also be used for storing frequently used data by duplicating the frequently used data from the map DB 16. The external memory 17 may also be provided by a removable memory having a comparatively small capacity.

The display device 18 is, for example, capable of performing a full color display. The display device 18 may be provided by a liquid crystal display, an organic EL display, a plasma display or the like. Further, the audio output device 19 is configured with a speaker or the like, and outputs voice guidance or the like based on an instruction from the control device 25.

The operation switch group 20 is provided by a touch switch integrated with the display device 18, mechanical switches, and the like as an example. The operation switch group 20, in response to manipulations made to the switch by the user, transmits various operation instructions to the control device 25.

The remote controller 21 is equipped with multiple manipulation switches (not shown). Similar to the operation switch group 20, the remote controller 21 is able to transmit operation instructions to the control device 25 via the remote controller sensor 22 when manipulated by the user.

The external input I/F 23 is an interface through which the control device 25 acquires vehicle state information from an electronic control unit (ECU) and sensors mounted in the subject vehicle. For example, the vehicle state information is inputted to the external input I/F 23 from the ECU and the sensors mounted in the subject vehicle via a vehicle local area network (LAN) or the like based on a communication protocol, such as CAN (controller area network).

For example, the vehicle state information may include a shift position sensor signal, a parking brake switch ON/OFF signal, a door courtesy switch ON/OFF signal, an ignition power source ON/OFF signal, a vehicle position successively detected by the position detector 11, and the like.

The communication device 24 performs communication with the center 3 via a base station and the network. The communication device 24 may perform a communication with the center 3 through an on-board communication module used in telematics communication such as DCM (data communication module) mounted in a vehicle. In addition, the communication device 24 may perform a communication with the center 3 through a DSRC (dedicated short range communication) communication module or through a mobile terminal connected with Bluetooth (registered trademark) or the like.

The control device 25 is configured with a microcomputer as a main component. The microcomputer includes a CPU, a ROM, a RAM, a backup RAM and the like. The control device 25 executes a process for providing a navigation functions, such as route search and route guidance, and executes a process (hereinafter, referred to as "area map provision related process") for providing an area map provision related function and the like based on various information inputted from the position detector 11, the map DB 16, the external memory 17, the operation switch group 20, the remote controller sensor 22, the external input I/F 23, and the communication device 24. The area map provision related process will be described in detail later.

For example, the control device 25 performs information transmission process. In the information transmission process, the above vehicle state information acquired via the external input I/F 23 is transmitted via the communication device 24 to the center 3.

The vehicle state information acquired during a predetermined time period may be transmitted together at one time instead of transmitting the vehicle state information in response to every detection of the vehicle state information. Further, the vehicle position may be transmitted in response to every detection of the current position and the shift position sensor signal, the parking brake switch ON/OFF signal, the door courtesy switch ON/OFF signal and the ignition power source ON/OFF signal may be transmitted in response to a change has occurred in any one of the signals.

When the vehicle state information is transmitted, identification information to specify a user of a sending party is attached to the vehicle state information. The identification information to specify the user of the sending party may include a vehicle ID of the subject vehicle, a device ID of the navigation device 1 or the communication device 24, or the like.

Further, in the information transmission process, activity range information of the user of the navigation device 1 is transmitted via the communication device 24 to the center 3. The activity range information may be transmitted in correspondence with transmission timing of the vehicle state information. As another example, the activity range information may be transmitted when the ignition power source of the subject vehicle is turned on.

The activity range information is information indicating a region where the subject vehicle has traveled by a predetermined or larger number of times (for example, thrice) (multiple times travelling region). In addition, activity range information may be provided by travelling history information of the subject vehicle to acquire the multiple times travelling region by the center 3. The travelling history information may be information indicating a traveled link and the number of travels, or may be a group of informations indicating multiple vehicle positions detected in the past.

When the activity range information is transmitted, the above identification information and category specifying information to specify a category of the sending party user are attached to the activity range information. For example, the category specifying information may include information on a vehicle class of the vehicle driven by the user, a music genre which the user likes, a model of the communication terminal such as a cellular phone used by the user, the user's living area, the user's friends and acquaintances, and the like.

The information on the vehicle class is acquired from the ECU or the like of the subject vehicle. The information on the favorite music genre is acquired by specifying a genre regarding which the number of play times is the maximum from play history in an audio device of the subject vehicle, the user's portable audio player or a communication terminal. The information on the model of the mobile terminal is acquired from the mobile terminal used by the user.

As the living area information, the above multiple times travelling region may be used as the living area, or an administrative district such as a city, a town, a village, or a ward where the user's house is positioned may be used as the living area, or a range within a predetermined distance from the user's house may be used as the living area.

As the information on the friends and acquaintances, addresses and telephone numbers of friends and acquaintances may be acquired from an address book of a communication terminal used by the user. Herein, the addresses and telephone numbers of the friends and acquaintances may be acquired by utilizing a social network service of the communication terminal used by the user. When transmitting the information on the friends and acquaintances as the category specifying information to the center 3, the user's address and telephone number may be transmitted with information indicating that the address is the user's address.

When the navigation device 1 is an on-board navigation device and the information in the portable audio player or the communication terminal is acquired, the information is acquired while the subject device is performing wireless communication by Bluetooth or wired communication by USB connection with the portable audio player or the communication terminal such as a mobile terminal. Further, when the navigation device 1 is provided by a communication terminal and the information in the communication terminal needs to be acquired, the information on the subject device can be utilized.

Figure 3:
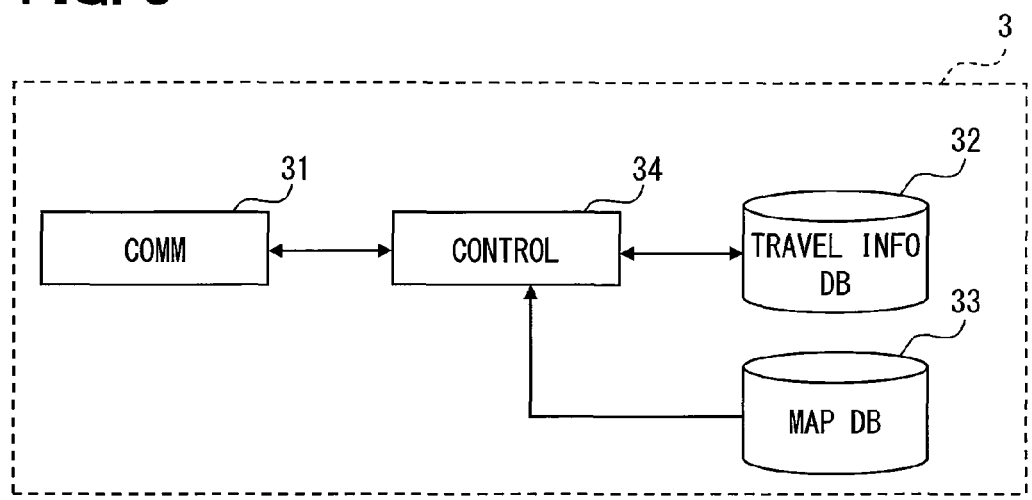
FIG. 3 is a block diagram showing an example of a schematic configuration of a center included in the area map provision system.

Returning to FIG. 1, for example, the center 3 is provided by a base station emplaced on the ground, and is configured with a server device. A schematic configuration of the center 3 will be described with reference to FIG. 3. The center 3 includes a communication unit (COMM) 31, a travel information database (TRAVEL INFO DB) 32, a map DB (MAP DB) 33, and a control unit (CONTROL) 34. The center 3 may have one server device or may have multiple server devices. The center 3 corresponds to the server device. Hereinafter, the travel information database is also referred to as travel information DB.

The communication unit 31 receives the vehicle state information and the identification information transmitted from the navigation device 1, and inputs the received information to the control unit 34. The communication unit 31 receives the vehicle state information from each navigation device 1 of each of the multiple vehicles. The vehicle state information corresponds to the travel information, and the communication unit 31 corresponds to the information collection unit.

Further, the communication unit 31 receives the activity range information, the identification information, and the category specifying information transmitted from the navigation device 1, and inputs the informations to the control unit 34. The communication unit 31 receives the activity range information from each navigation device 1 of each of the vehicles. Accordingly, the activity range information corresponds to the activity range information.

In addition, the communication unit 31 may receive traffic amount information distributed from a VICS (registered trademark) center via the network, beacons installed on roads, and FM broadcasting stations in various locations. The communication unit 31 may input the information to the control unit 34. The traffic amount information distributed from the VICS center also corresponds to the travel information. The traffic amount information distributed from the VICS center may also be referred to as traffic jam information.

Further, the communication unit 31 transmits area map display related information, which will be described later, to the navigation device 1 in accordance with an instruction from the control unit 34. The above vehicle state information, the activity range information, and the like, are stored in the travel information DB 32. As in the case of the above map DB 16, the road map data, the POI data of various facilities, and the like, are stored in the map DB 33.

The control unit 34 is configured with a microcomputer as a main component. The microcomputer has a CPU, a ROM, a RAM, a backup RAM and the like. The control unit 34 performs various processes, such as the travel information accumulation related process and the area map generation related process, based on the various information inputted from the communication unit 31, the travel information DB 32, and the map DB 33.

Figure 4:
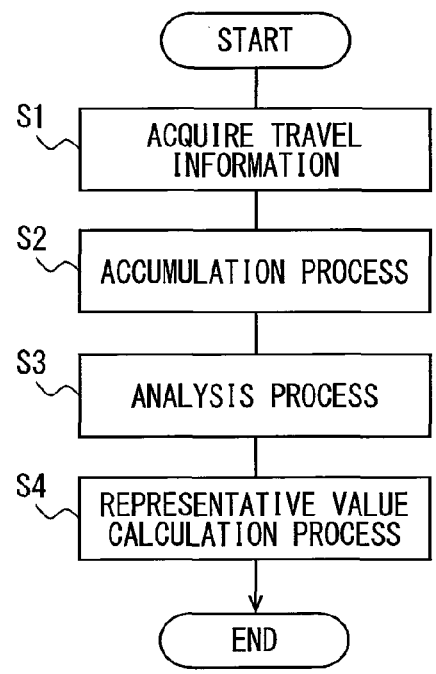
FIG. 4 is a flowchart showing an example flow of a travel information accumulation related process executed by a control section included in the center.

The following will describe a flow of the travel information accumulation related process executed by the control unit 34 with reference to the flowchart shown in FIG. 4. For example, the process shown in FIG. 4 starts in response to a turning on of the power source of the server device in the center 3.

First, at S1, the control unit 34 acquires the vehicle state information and the activity range information transmitted from the navigation device 1 and received by the communication unit 31, and acquires the travel information such as the traffic amount information transmitted from the VICS center and received by the communication unit 31. Then, the control unit 34 proceeds to S2. The process executed at S1 by the control unit 34 corresponds to the information collection unit.

At S2, the control unit 34 performs an accumulation process, and proceeds to S3. In the accumulation process, when the control unit 34 has acquired the vehicle state information, the control unit 34 stores the vehicle state information in the travel information DB 32 corresponding to the sending party user which is identified based on the identification information attached to the acquired vehicle state information. Further, in the accumulation process, when the control unit 34 has acquired the traffic amount information, the control unit 34 correlates the acquired traffic amount information to a distribution time of the traffic amount information from the VICS center, and stores the traffic amount information in the travel information DB 32.

Further, in the accumulation process, when the control unit 34 has acquired the activity range information, the control unit 34 stores, in the travel information DB 32, the acquired activity range information corresponding to the sending party user. Herein, the sending party user is identified based on the identification information and the category specifying information attached to the acquired activity range information.

Regarding the activity range information, when the control unit 34 has newly acquired the activity range information to which the same identification information is linked and the category specifying information to which the same identification information is linked, the control unit 34 stores the information by overwriting the stored information, to update the stored information with the newly acquired activity range information and the category specifying information.

At S3, the control unit 34 performs an analysis process, and proceeds to S4. In the analysis process, a concentration degree indicating the degree of concentration of people at each of multiple points on a map is determined, based on the vehicle state information and the traffic amount information stored in the travel information DB 32 by the accumulation process and the road map data stored in the map DB 33. The process executed at S3 by the control unit 34 corresponds to the concentration degree determination unit. Herein, the point may be a point indicated by, for example, the same latitude and longitude, or may be a spot having a range of several meters to several tens of meters.

The analysis process may be performed with respect to the vehicle state information and the traffic amount information, which are stored in the travel information DB 32 in the accumulation process during an object period before predetermined time (for example, 5 minutes) or from the execution of previous analysis process to current analysis process.

As an example, in the analysis process, based on the ignition power source ON/OFF signal and the vehicle position information among the vehicle state information stored in the object period, the number of vehicles in which the ignition power source ON/OFF has been switched (hereinafter, referred to as "IG switched vehicles") at each point on the map is calculated, and the calculated number of IG switched vehicles is determined as the degree of concentration at each point. This process is performed because parking of a vehicle is able to be estimated based on the ignition power source ON/OFF switching and the occupant's visit to a facility is able to be estimated based on the parking of the vehicle.

Similarly, instead of the ignition power source ON/OFF signal, one of the parking brake switch ON/OFF signal, the door courtesy switch ON/OFF signal, and the shift position sensor signal indicating that the shift position is in the parking position may be used to estimate occupant's visit to a facility.

As another example, in the analysis process, the control unit 34 may calculate the number of vehicles at each point on the map, and determines the calculated number of vehicles as the degree of concentration at each point, based on the vehicle position information among the vehicle state information stored during the object period. Further, in the analysis process, the control unit 34 may determine the traffic amount at each point on the map as the degree of concentration at each point based on the traffic amount information stored during the object period. The traffic amount indicated by the traffic amount information may be divided into, for example, three degrees including normal, crowded, and jammed.

As another example, in the analysis process, the control unit 34 may calculate the number of vehicles departed from the roads and entered a private area of a facility based on the vehicle position information among the vehicle state information stored in the object period, and determines the number of vehicles that is calculated as the degree of concentration at each point.

In the analysis process, when vehicle state informations having identical identification information exist in the vehicle state informations stored during the object period, the latest vehicle state information may be used.

Further, every time the flow is repeated to perform the analysis process, the degree of concentration at each point is accumulated with time by successively storing the determined degree of concentration at each point in the travel information DB 32. The stored degree of concentration at each point is deleted when a predetermined period has elapsed since the degree of concentration was stored.

At S4, the control unit 34 performs a representative value calculation process, after ending the travel information accumulation related process. In the present embodiment, S1 to S4 are repeatedly performed. In the representative value calculation process, a representative value of concentration degree at each point is calculated by statistically processing the degrees of concentrations successively determined in the analysis process. Accordingly, the process executed at S4 by the control unit 34 corresponds to the representative value calculation unit. As an example, an arithmetic mean value of the degrees of concentration accumulated before an execution of S4 may be calculated with respect to each point, and the calculated arithmetic mean value may be determined as the representative value.

In the above example, the arithmetic mean value is determined as the representative value. However, the calculation of representative value is not limited to this calculation method. For example, an intermediate value of the degrees of concentration accumulated before the execution of S4 may be calculated with respect to each point, and the calculated intermediate value may be determined as the representative value. Further, a mode of the degrees of concentration accumulated before the execution of S4 may be calculated with respect to each point, and the calculated mode may be determined as the representative value. The representative value can also be referred to as normal value of the degrees of concentration at each point.

Further, in the representative value calculation process, a representative value may be calculated with respect to each time segment obtained by dividing twenty four hours of single day by a predetermined number. In this case, the degrees of concentration at respective points accumulated before the execution of S4 are divided into multiple time segments and the representative value for each time segment is calculated.

Figure 5:
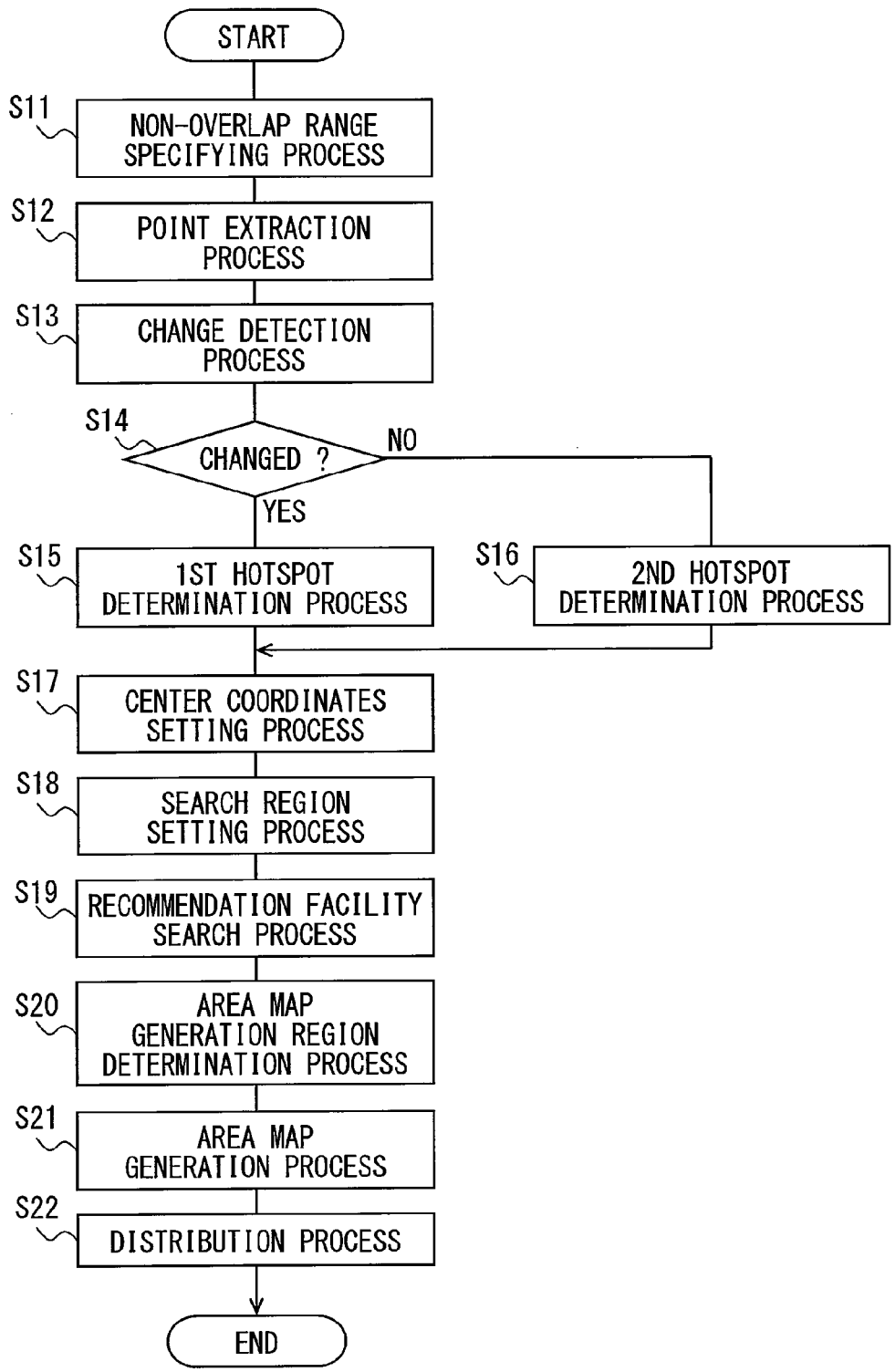
FIG. 5 is a flowchart showing an example flow of an area map generation related process executed by the control section included in the center according to a first embodiment of the present disclosure.

The following will describe an area map generation related process executed by the control unit 34 with reference to the flowchart shown in FIG. 5. The process shown in FIG. 5 starts when the control unit 34 determines that the communication unit 31 has received a request signal from the navigation device 1. The request signal from the navigation device 1 includes the above-described activity range information, the identification information, and the category specifying information, in addition to information that requests execution of the area map generation related process.

At S11, the control unit 34 performs non-overlap range specifying process, and proceeds to S12. In the non-overlap range specifying process, the control unit 34 specifies the activity range of a user (hereinafter, referred to as "different user activity range") partially overlapping with the activity range of the sending party user (hereinafter, referred to as "target user") of the request signal, based on the activity range information stored in the travel information DB 32 in the accumulation process and the activity range information included in the request signal. Then, the control unit 34 specifies, in the different user activity range that is specified, a range other than the activity range of the target user (hereinafter, referred to as "non-overlap range"). The process executed at S11 corresponds to the non-overlap range specifying unit.

In the non-overlap range specifying process, the control unit 34 may specify an activity range of a user who is included in the same category with the target user, as the different user activity range, and further specifies the non-overlap range in the different user activity range based on the category specifying information and the activity range information stored in the travel information DB 32 in the accumulation process and the category specifying information and the activity range information included in the request signal (first modification). Herein, the activity range of the different user partially overlaps with the activity range of the target user.

The control unit 34 determines whether a user corresponding to the same category exists as follows. For example, suppose that the category specifying information is a vehicle type, a favorite music genre, or a communication terminal model. In this case, when a user whose vehicle type, favorite music genre, or communication terminal model is the same as that of the target user exists, the control unit 34 determines that the user belongs to the same category with the target user. Suppose that the category specifying information is a living area. In this case, when a user whose living area overlaps with the target user's living area by a predetermined ratio or higher, the control unit 34 may determine that the user belongs to the same category with the target user. Otherwise, when a living area of a user is identical to the target user's living area, the control unit 34 may determine that the user belongs to the same category with the target user. Suppose that the living area is the above-described multiple times travelling region. In this case, when there is a predetermined or higher ratio of overlapping area exists between the two living areas, the control unit 34 may determine that the user belongs to the same category with the target user. Suppose that the category specifying information is the friends and acquaintances information. In this case, when the address and telephone number of the target user are included in a user's information, the control unit 34 may determine that the user belongs to the same category with the target user.

Further, suppose that the category specifying information includes multiple types of informations such as the friends and acquaintances informations and the living area information. In this case, when a user having at least one type of information belonging to the same category exists, the control unit 34 may determine that the user belongs to the same category with the target user.

Suppose that the category specifying information includes multiple types of informations. In this case, the priority may be set for each information type, the control unit 34 may extract the different user activity range of a user belonging to the same category, successively from high priority type information, and the extraction is terminated when the number of extracted different user activity ranges becomes equal to a predetermined number. For example, since it is considered that there is a high possibility that the preferences of users, when belonging to the same category, are similar to each other, in an order of friends and acquaintances>living area>music genre, vehicle type, terminal device model, the priority order may be made in accordance with above-described order.

At S12, the control unit 34 performs a point extraction process, and proceeds to S13. In the point extraction process, among the respective points at which the concentration degree has been determined in the most recent analysis process, the control unit 34 extracts a point at which the concentration degree is equal to or higher than a threshold value and is included in the non-overlap range specified in the non-overlap range specifying process. The threshold value here is an arbitrarily settable value, and a predetermined concentration degree based on which the traffic can be estimated to be crowded may be set as the threshold value. In addition, the control unit 34 may set a value approximately equal to an error range of the representative value generated in the representative value calculation process as the threshold value, for the purpose of preventing erroneous determination of presence/absence of changed point to be described later.

At S13, the control unit 34 performs a change detection process, and proceeds to S14. In the change detection process, the control unit 34 calculates a differential value between the concentration degree determined in the most recent analysis process at the point extracted in the point extraction process and the representative value of the concentration degree at each point calculated in the representative value calculation process. The differential value is calculated by subtracting the representative value of the concentration degree determined in the most recent analysis process from the concentration degree determined in the latest analysis.

Further, in the change detection process, the control unit 34 may calculate the differential value with respect to the representative value obtained during a time segment, which is the same with the time segment in which the concentration degree has been determined in the most recent analysis process (second modification). The time segment described herein indicates each segment of time obtained by dividing twenty four hours of single day by the predetermined number.

In the foregoing embodiments, during the multiple time segments, a distribution of the concentration degrees may be not uniform in accordance with the time segment. However, according to the second modification, the differential value calculation is performed with the representative values during the same time segment as target. Thus, a differential value having a higher accuracy can be calculated while suppressing the influence of the non-uniform distribution of the concentration degrees in accordance with time segments.

At S14, the control unit 34 determines whether a point at which the differential value calculated in the change detection process is equal to or greater than a predetermined value exists. Hereinafter, the point at which the differential value is equal to or greater than the predetermined value will be referred to as "change point". When the control unit 34 determines that a change point exists (YES at S14), the control unit 34 proceeds to S15. On the other hand, when the control unit 34 determines that no change point exists (NO at S14), the control unit 34 proceeds to S16.

At S15, the control unit 34 performs a first hotspot determination process, and proceeds to S17. In the first hotspot determination process, the control unit 34 determines the change points specified at S14 as hotspots. Accordingly, the process executed by the control unit 34 at S15 corresponds to the hotspot determination unit. When no change point is acquired by the processes at S11 to S15, the threshold value used in the point extraction process is lowered or the number of category types for determination of the same user in the non-overlap range specifying process is increased, and the flow is repeated so as to acquire change points.

At S16, the control unit 34 performs a second hotspot determination process, and proceeds to S17. In the second hotspot determination process, when the concentration degree by which a crowded state can be determined is set as the threshold value in the point extraction process, the control unit 34 determines the point extracted in this point extraction process as the hotspot.

Further, in the second hotspot determination process, when a value approximately equal to an error range of the representative value calculation in the representative value calculation process is set as the threshold value in the point extraction process, a point at which the concentration degree determined in the most recent analysis process is equal to or higher than a predetermined concentration degree based on which a crowded state can be estimated, is determined as a hotspot. Accordingly, the process executed by the control unit 34 at S16 also corresponds to the hotspot determination unit.

When no change point is acquired by the processes at S11 to S14 and S16, the threshold value in the point extraction process may be lowered, and the flow is repeated so as to acquire the change points.

In the flowchart shown in FIG. 5, at S11 to S15, or S11 to S14 and S16, in order, points are narrowed down based on non-overlap range, concentration degree, differential value, and the like, as conditions, to determine the multiple hotspots. However, the order of the narrow down conditions is not limited to the order shown in FIG. 5. The order of narrow down conditions may be changed different from the order shown in FIG. 5.

At S17, the control unit 34 performs a central coordinates setting process, and proceeds to S18. In the central coordinates setting process, the control unit 34 sets the position coordinates of each hotspot determined in the first hotspot determination process or each hotspot determined in the second hotspot determination process as central coordinates of a search region. The search region will be described later. The central coordinates correspond to the reference points.

Herein, the position coordinates of the hot spots are set as the central coordinates. However, the present disclosure is not limited to this configuration. For example, the position coordinates of the hotspots may be set as coordinates of a predetermined corner point of a rectangular search region, which will be described later.

At S18, the control unit 34 performs a search region setting process, and proceeds to S19. In the search region setting process, the control unit 34 sets a region within a predetermined range from the central coordinates set in the central coordinates setting process as a search region in an electronic map. Assuming that the longitude is x coordinate and the latitude is y coordinate, a rectangular range respectively distant by 1 km in both x direction and y direction from the central coordinates, or a circular range having a radius of 1 km from the central coordinates, may be defined as the predetermined range from the central coordinates. Herein, a distance which a general user feels small hesitation to walk may be set as the predetermined range.

At S19, the control unit 34 performs a recommendation facility search process, and proceeds to S20. In the recommendation facility search process, the control unit 34 searches for a recommendation facility determined based on the preferences of the target user. Accordingly, the process executed at S19 by the control unit 34 corresponds to the recommendation facility search unit. The parent population in the recommendation facility search is limited to facilities classified as predetermined types corresponding to the object of the recommendation facility search process (hereinafter, referred to as "appropriate facility").

The types of the appropriate facilities are stored in a non-volatile memory of the control unit 34. For example, the types of the appropriate facilities may include eating and drinking establishments such as a restaurant, a cafe and a Japanese style bar, a variety store, an amusement store, a museum and the like. Facilities not related to amusement, such as a coin operated parking space, a hospital and the like are excluded from the appropriate facilities.

In the recommendation facility search process, facilities that suit the preferences of the target user are estimated and famous facilities are specified. The facilities that suit the preferences of the target user (hereinafter, referred to as "preferences estimated facilities") and the famous facilities are excluded from the appropriate facilities, and the remaining facilities are extracted as the recommendation facilities. Accordingly, the process executed by the control unit 34 at S19 also corresponds to the facility estimation unit.

The estimation of the facilities that suit the preferences of the target user is performed based on the activity history of the target user. For example, the activity history may be provided by the vehicle state information stored in the travel information DB 32 related to the target user. Accordingly, the above process executed by the control unit 34 at S1 also corresponds to the activity history acquisition unit.

An example for estimating the facilities that suit the preferences of the target user will be described below. First, in the vehicle state information related to the target user, a point at which the target user has parked the vehicle is specified based on the vehicle position, more specifically, based on the ignition power source ON/OFF signal. Next, based on the road map data stored in the map DB 33, a facility closest to the specified point is determined as the facility which is visited by the target user. Further, based on the POI data stored in the map DB 33, the type of the facility visited by the target user is specified. Then, when the type of the facility visited by the target user is specified by over a predetermined number of times, the facility having the specified type is estimated as a facility that suit the preferences of the target user.

Further, the famous facilities here are facilities retaining comparatively high public name recognition which have been introduced in a magazine, in a TV program, on a blog and the like. The famous facilities are previously stored in the non-volatile memory of the control unit 34. Accordingly, the control unit 34 corresponds to the famous facility storing unit. Then in the recommendation facility search process, the facilities stored in the memory are specified as the famous facilities and the above process is performed. As a method for storing the famous facilities, the storing may be performed by a manual input to the center 3 by an operator. As a publicly known method, the famous facilities may be stored based on information collected from various data of electronic medium.

As described above, the recommendation facilities are extracted from the appropriate facilities, which are remained after an exclusion of the estimated preferred facilities and the famous facilities. Thus, the facilities which are not well-known by people or the facilities that has the type the target user does not usually visit can be recommended to the target user. As a result, the possibility that the target user newly finds a facility suiting his/her preferences can be increased.

In the above-described recommendation facility search process, the recommendation facilities are extracted from the appropriate facilities, which are remained after an exclusion of the estimated preferred facilities and the famous facilities. The present disclosure is not limited to this configuration. As another example, the recommendation facilities may be extracted from the estimated preferred facilities and the famous facilities. According to this configuration, guidance to the estimated preferred facilities and the famous facilities estimated as facilities that suit the preferences of the target user from the target user's usual activities can be provided to the target user.

Further, in the recommendation facility search process, facilities remained after an exclusion of the estimated preferred facilities from the appropriate facilities or the facilities remained after an exclusion of the famous facilities from the appropriate facilities may be extracted as the recommendation facilities.

At S20, the control unit 34 performs an area map generation region determination process, and proceeds to S21. In the area map generation region determination process, the control unit 34 selects a predetermined number of search regions including a larger number of facilities corresponding to the recommendation facilities extracted in the recommendation facility search process, and determines the selected search regions as area map generation regions. The predetermined number here is a plural number. For example, the predetermined number is equal to five.

At S21, the control unit 34 performs an area map generation process, and proceeds to S22. In the area map generation process, the control unit 34 generates an area map with respect to the area map generation regions determined in the area map generation region determination process. Accordingly, the process executed by the control unit 34 at S21 corresponds to the area map generation unit.

The area map is generated by overlaying the icons indicating recommendation facilities distinguishably from other facilities, in the area map generation region of the map. For example, in the area map, the recommendation facilities are indicated by icons in uniform color different from colors of other facilities in order to be distinguished from other facilities. In addition, the icons of the recommendation facilities may have larger sizes compared with icons of other facilities.

Further, when the recommendation facilities are selected from the facilities after the exclusion of the estimated preferred facilities and the famous facilities, in addition to the icons indicating the recommendation facilities, icons may also be overlaid on the area map for distinguishably indicating the estimated preferred facilities from other facilities (third modification). For example, in the area map, the estimated preferred facilities may be indicated with the icons having the same color different from colors of other facilities for distinguishment purpose.

Suppose that the facilities after the exclusion of the estimated preferred facilities and the famous facilities do not include any facility that suit the actual preferences of the user. In this case, since the estimated preferred facilities are included in the area map, there is a possibility that the estimated preferred facility may suit the actual preferences of the user. Accordingly, a failure in guidance for a facility that suits the actual preferences of the user can be avoided.

Further, an icon indicating each facility corresponding to each of the hotspots distinguishably from other facilities may be overlaid on the area map (fourth modification). For example, based on the road map data and the POI data stored in the map DB 33, the control unit 34 specifies a facility closest to the position coordinates of the hotspot, and determines the specified facility as a facility corresponding to the hotspot. Accordingly, the control unit 34 corresponds to the facility specifying unit. Further, in the area map, the facilities corresponding to the hotspots may be displayed with icons having the same color in order to distinguish from other facilities having different colors.

Further, the area map may be generated such that brief explanations of the recommendation facilities and the estimated preferred facilities are displayed in a pop up manner in the area map.

In addition, the recommendation facilities in the area map may be indicated, not only by an icon, but also by a text or an image other than the icon, under a condition that the recommendation facilities are distinguishably represented from other facilities on the map. Also the estimated preferred facilities and the facilities corresponding to the hotspots in the area map may be indicated by any one of the icons, the texts, the images or other symbols.

At S22, the control unit 34 performs a distribution process, and terminates the process shown in FIG. 5. In the distribution process, the control unit 34 transmits the data of the area map generated in the area map generation process via the communication unit 31 to the navigation device 1 of the target user.

Figure 6:
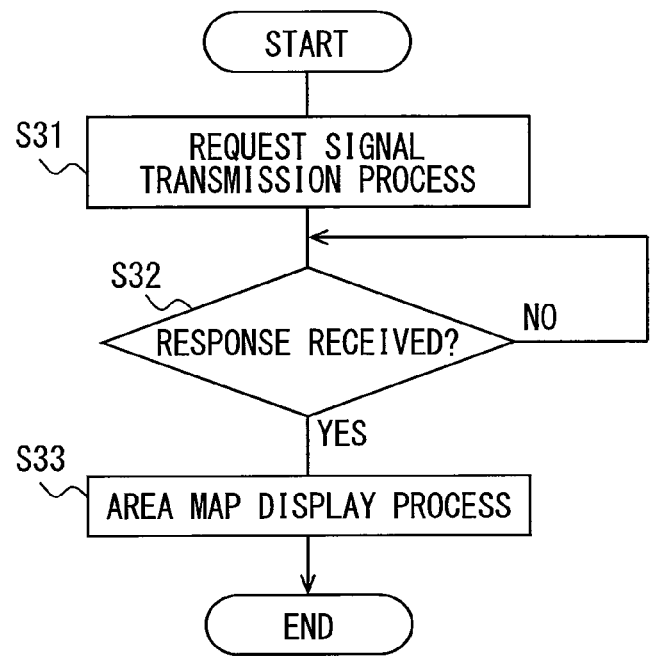
FIG. 6 is a flowchart showing an example flow of an area map display related process executed by a control device of the navigation device.

The following will describe the area map display related process executed by the control device 25 of the navigation device 1 with reference to the flowchart shown in FIG. 6. The process shown in FIG. 6 starts when a request signal transmission trigger is detected in the control device 25. For example, the request signal transmission trigger may include a reception of manipulation made by a user to the operation switch group 20 or to the remote controller 21 for requiring a provision of an area map.

First, at S31, the control device 25 performs a request signal transmission process, and proceeds to S32. In the request signal transmission process, the control device 25 transmits a request signal via the communication device 24 to the center 3. The request signal includes the activity range information, the identification information, and the category specifying information, in addition to the information that requests an execution of the area map generation related process as described above.

At S32, the control device 25 determines whether a response to the transmitted request signal has been received. The response to the transmitted request signal is information distributed by the distribution process of the center 3 as a result of area map generation related process executed by the center 3 corresponding to the request signal. In the example of the flowchart in FIG. 5, the response to the request signal is the area map data. When the control device 25 determines that the response has been received (YES at S32), the control device 25 proceeds to S33. When the control device 25 determines that the response has not been received, (NO at S32), the control device 25 repeats the process at S32.

At S33, the control device 25 performs an area map display process, and terminates the process shown in FIG. 6. In the area map display process, the control device 25 displays an area map on the display device 18 based on the area map data received from the center 3 via the communication device 24. Accordingly, the process at S33 executed by the control device 25 corresponds to the display unit.

Figure 7A:
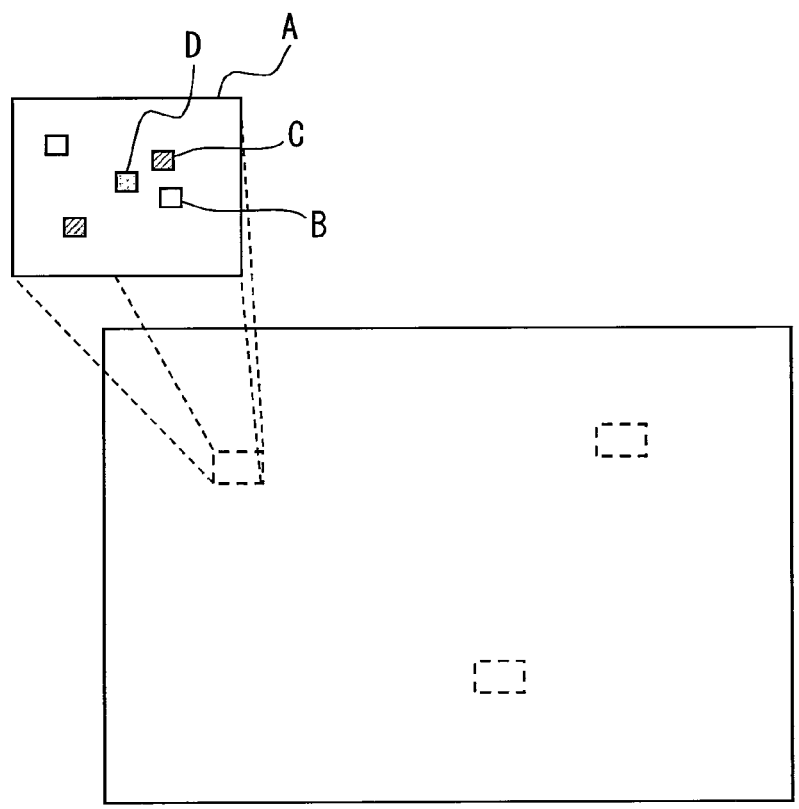
FIG. 7A and FIG. 7B are schematic diagrams showing an example of an area map display.
Figure 7B:
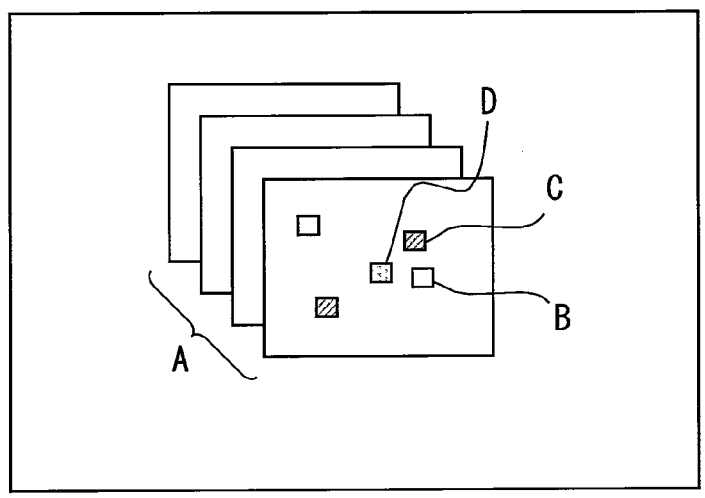

The following will describe an example of area map display with reference to FIG. 7A and FIG. 7B. In the examples shown in FIG. 7A and FIG. 7B, an area map A includes an icon B indicating a facility other than the recommendation facilities and the estimated preferred facilities, an icon C indicating an estimated preferred facility, and an icon D indicating a facility corresponding to a hotspot.

As an example, a frame (see a broken line frame in FIG. 7A) indicating a map region corresponding to the area map A is displayed on the map. Then, when this frame is selected by the user by manipulating the switch group 20 or the remote controller 21, the area map A corresponding to the selected frame is enlarged (see FIG. 7A).

As another example, multiple area maps A are displayed on the screen in a stacked manner. When one area map A is selected by the user by manipulating the operation switch group 20 or the remote controller 21, the selected area map A is displayed on a top layer (see FIG. 7B). Area map display methods other than above-described methods herein may be used for displaying the area maps.

Further, when the user selects one area map from the multiple area maps by manipulating the operation switch group 20 or the remote controller 21, the control device 25 of the navigation device 1 searches for a route to the point included in the selected area map, and performs route guidance to the point. When a route search is made by the user, for example, position coordinates of the hotspot may be set as a destination. The user may also set a recommendation facility included in the area map as the destination by manipulating the operation switch group 20 or the remote controller 21.

In the first embodiment, the control unit 34 of the center 3 executes the processes of S11 to S22. As another example, the control device 25 of the navigation device 1 may execute a part or entire processes of S12 to S21. Thus, the control device 25 may also correspond to the hotspot determination unit, the recommendation facility search unit, the facility estimation unit, and the area map generation unit.

In the above-described configuration, the control device 25 of the navigation device 1 acquires information related to the concentration degree at each point, the above representative value and the like from the center 3, and performs a part or entire processes of S12 to S21. Further, the famous facilities may be previously stored in the non-volatile memory of the control device 25. The control device 25 may acquire the vehicle state information as activity history of the target user from the vehicle of the target user. Further, the control device 25 may specify a facility corresponding to a hotspot based on the road map data and the POI data stored in the map DB 16. Thus, the control device 25 corresponds to the famous facility storing unit, the activity history acquisition unit, and the facility specifying unit.

Further, when the control device 25 of the navigation device 1 executes a part or entire processes of S12 to S21, the information transmitted to the navigation device 1 in the distribution process at S22 is changed in accordance with which portion of processes from S12 to S21 is executed by the control unit 34 of the center 3.

According to the configuration of the first embodiment, a point at which the concentration degree is equal to or higher than the threshold value is estimated as a point at which people are actually gathered. Herein, the concentration degree is determined in the analysis process. Thus, there is a high possibility that an actually popular facility exists at the hotspot or around the hotspot. According to the configuration of the first embodiment, an area map of a map region is displayed with the hotspot as central coordinates. Thus, a peripheral region including the actually popular facility can be guided to the user. Accordingly, the actually popular facility can be easily found by the user.

In the present embodiment, multiple area maps are displayed corresponding to multiple map regions. Thus, the user is able to select an area, which have great number of recommendation facilities and seem to actually suit the preferences of himself or herself, from the multiple area maps. When the user actually visits one recommendation facility included in the selected area and found that the recommendation facility does not suit the actual preferences of the user, the user may visit another recommendation facility included in the selected area. In this case, another recommendation facility may suit the actual preferences of the user more than the recommendation facility firstly visited by the user. Thus, a possibility that the user visits a facility suiting the actual preferences of the user can be increased.

Further, an area map of a map region is generated and displayed with the hotspot as central coordinates. Herein, the hotspots are automatically determined in the first hotspot determination process or in the second hotspot determination process. Thus, the area map can be generated and displayed without any manipulation made by the user, for example, inputting a search keyword. Thus, a user's labor to select a visit destination facility can be suppressed while enabling guidance to the actually popular facilities. Further, the possibility that the user visits a facility suiting the user's actual preferences can be increased.

In the configuration of the first embodiment, in the first hotspot determination process, a hotspot is determined under the condition that the most recent value of the concentration degree at each point is greater than the representative value by a predetermined value or by a value greater than the predetermined value. Herein, the representative value is deemed as a normal value. That is, a point at which the concentration degree is higher than the normal value is set as the hotspot. Thus, the point that is set as the hotspot can be, dynamically changed in real time and differs from day to day. As a result, provision of always almost the same area map to the user by always determining almost the same point as a hotspot can be avoided, and an area map having freshness can be provided to the user.

According to the configuration of the first embodiment, a periphery area of the activity range of the target user other than the activity range of the target is used for setting the hotspot and generating the area map, and the area map is provided to the user. Thus, a facility that is not included in the user's activity range can be provided to the user, and the user can have an opportunity for fresh discoveries.

Second Embodiment

The present disclosure is not limited to the above-described first embodiment, but the next second embodiment is also included in the technical range of the present disclosure. The following will describe the second embodiment of the present disclosure with reference to FIG. 8. For the sake of convenience of explanation, parts having the same functions as those of the elements shown in the figures used in the explanation of the above embodiment have the same reference numerals, and the explanation of these elements will be omitted.

An area map provision system 100 according to the second embodiment is similar to the area map provision system 100 according to the first embodiment. In the present embodiment, the target user activity range specifying process, which will be described later, is executed instead of the non-overlap range specifying process executed at S11 of the first embodiment.

Figure 8:
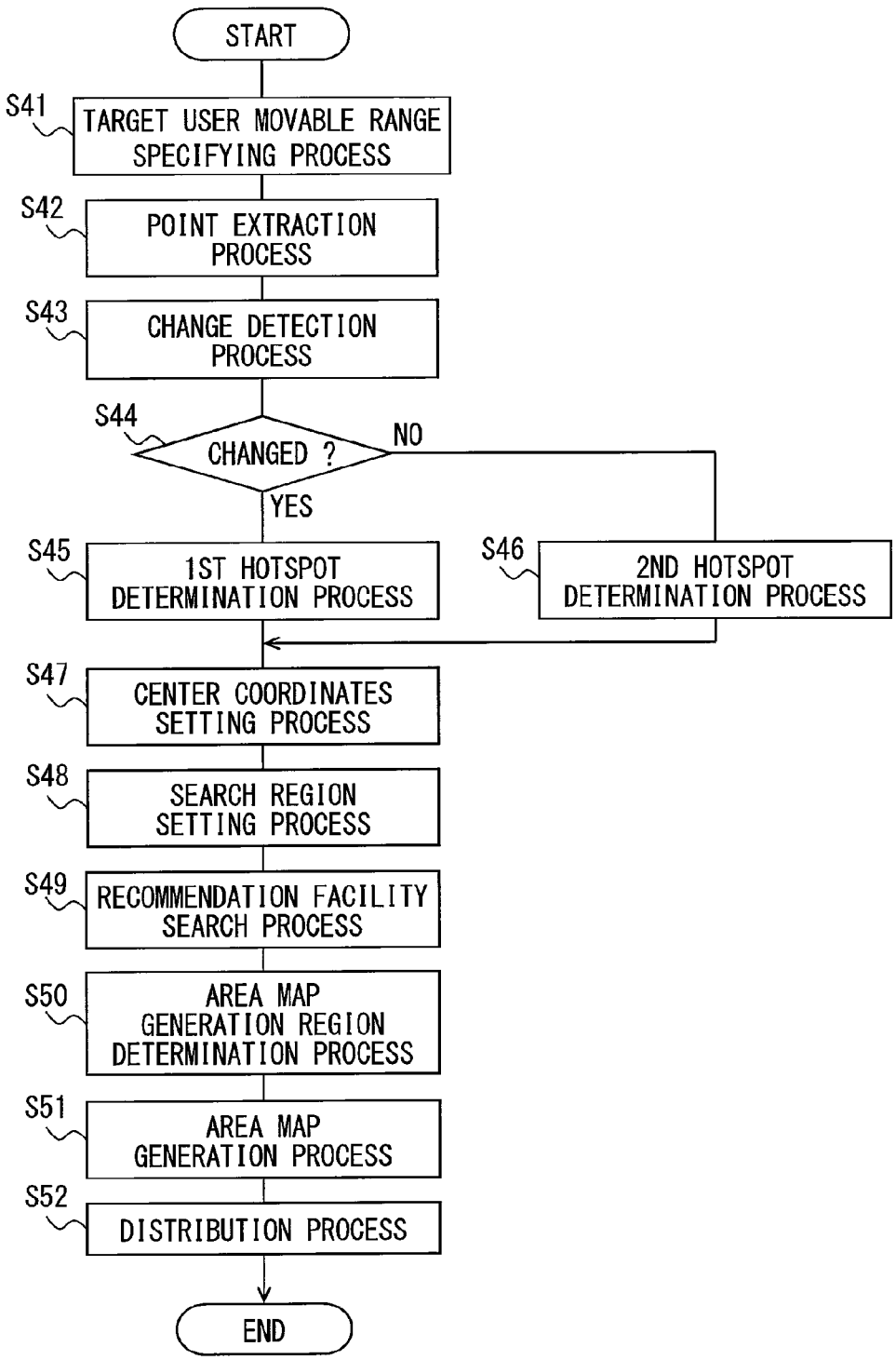
FIG. 8 is a flowchart showing an example flow of the area map generation related process executed by the control section included in the center according to a second embodiment of the present disclosure.

The following will describe the area map generation related process executed by the control unit 34 of the center 3 in the second embodiment with reference to the flowchart shown in FIG. 8. The process shown in FIG. 8 may start in response to a turning on of the power source of the server included in the center 3.

First, at S41, the control unit 34 performs target user activity range specifying process, and proceeds to S42. In the target user activity range specifying process, the control unit 34 specifies the activity range of the target user (hereinafter, referred to as "target user activity range") based on the activity range information included in the request signal from the target user. Accordingly, the process executed at S41 by the control unit 34 corresponds to the activity range specifying unit.

At S42, the control unit 34 performs the point extraction process, and proceeds to S43. In the point extraction process at S42, the control unit 34 extracts a point at which the concentration degree is equal to or higher than the threshold value, from the points where the concentration degrees of which have been determined in the most recent analysis process and included in the target user activity range specified in the target user activity range specifying process.

The processes of S43 to S52 are identical to the processes of S13 to S22. Accordingly, the processes executed by the control unit 34 at S45 and S46 correspond to the hotspot determination unit. The process executed by the control unit 34 at S49 corresponds to the recommendation facility search unit. The process executed by the control unit 34 at S51 corresponds to the area map generation unit.

In the second embodiment, the processes of S41 to S52 are executed by the control unit 34 of the center 3. As another example, the control device 25 of the navigation device 1 may execute a part or entire processes of S41 to S51. Accordingly, the control device 25 corresponds to the activity range specifying unit.

Further, when the control device 25 of the navigation device 1 executes a part or entire processes of S41 to S51, the information transmitted to the navigation device 1 in the distribution process at S52 is changed in accordance with which portion of processes from S41 to S51 is executed by the control unit 34 of the center 3.

With the configuration according to the second embodiment, advantages similar to the first embodiment can be provided. In the configuration of the second embodiment, a user's labor to select a visit destination facility can be suppressed while enabling guidance to actually popular facilities, and the possibility that the user visits a facility suiting the user's actual preferences can be increases.

In the above-described first embodiment and the second embodiment, the first hotspot determination process or the second hotspot determination process is performed in accordance with whether or not the most recent value of the concentration degree at each point is equal to or higher than a predetermined value. As another example, the calculation of the representative value can be skipped, and the determination whether the most recent value of the concentration degree at each point is equal to or higher than the representative value by a predetermined value or by a value greater than the predetermined value can be skipped (fifth modification).

For example, in the first embodiment, process executed at S4 in the flowchart of FIG. 4 may be omitted. Further, processes executed at S13 to S15 in the flowchart of FIG. 5 may be omitted, and process of S16 may be executed after the process of S12. For another example, in the second embodiment, the processes executed at S43 to S45 in the flowchart of FIG. 8 may be omitted, and the process of S46 may be executed after the process of S42.

In the above first embodiment and the second embodiment, multiple area maps associated with multiple map regions are displayed. As another example, only one area map associated with one map region can be displayed (sixth modification). In the sixth modification, the first hotspot determination process or the second hotspot determination process is performed in accordance with whether or not the most recent value of the concentration degree at each point is greater than the representative value by a predetermined value or is greater than the representative value by a value greater than the predetermined value.

Further, in the area map generation region determination process at S20 and S50 of sixth modification, one search region including greater number of facilities than other search regions is selected and the selected search region is set as a target of the area map generation region. Herein, the facilities correspond to the recommendation facilities extracted in the recommendation facility search process. Further, only one area map may be displayed by the area map display process of S33.

Specifically, suppose that, among multiple facilities having predetermined multiple types, a recommendation facility is searched from the facilities other than the famous facilities. Further, multiple search regions are respectively set on the map with multiple hotspots as reference points. The multiple search regions include a first search region and a second search region, and the first search region includes greater number of recommendation facilities than the second search region. In this case, the first search region is selected, and an area map is generated based on the first search region. As another example, suppose that, among multiple facilities having predetermined multiple types, a recommendation facility is searched from the facilities other than the estimated preferred facilities estimated by the facility estimation unit. Further, multiple search regions are respectively set on the map with multiple hotspots as reference points. The multiple search regions include a third search region and a fourth search region, and the third region includes greater number of recommendation facilities than the fourth search region. In this case, the third search region, and an area map is generated based on the third search region.

With the configuration of the sixth modification, a user's labor to select a visit destination facility can be suppressed while enabling guidance to actually popular facilities, and the possibility that the user visits a facility suiting the user's actual preferences can be increased. Further, provision of always almost the same area map by always determining almost the same point can be avoided, and an area map having freshness can be provided to the user.

Further, the navigation device 1 according to the above first embodiment and the second embodiment is not limited to an on-board navigation device. For example, the navigation device may be provided by a mobile terminal which can be brought in a vehicle and used in the vehicle, such as a cellular phone or a tablet PC having navigation functions. In addition, the navigation device may be provided by a mobile terminal which is not apt for a use in the vehicle such as a cellular phone or a tablet PC, or may be a terminal such as a notebook PC or a desktop type PC. Further, when the navigation device 1 is provided by a mobile terminal, a point at which the target user performs a check-in to a publicly known location service can be used as the activity history of the target user.

While the disclosure has been described with reference to preferred embodiments thereof, it is to be understood that the disclosure is not limited to the preferred embodiments and constructions. The disclosure is intended to cover various modification and equivalent arrangements. In addition, while the various combinations and configurations, which are preferred, other combinations and configurations, including more, less or only a single element, are also within the spirit and scope of the disclosure.

The invention claimed is:

1. An area map provision system comprising:
a terminal device; and
a server device communicating with the terminal device, wherein
the server device is configured to:
   collect a travel information related to a travel of each of a plurality of vehicles; and
   determine, based on the travel information, a concentration degree indicating a degree of a concentration of people at each of a plurality of points on a map,
one of the terminal device or the server device includes:
   determine a part of the points, each of which has the concentration degree equal to or higher than a threshold value, as a plurality of hotspots, a plurality of search regions being defined on the map with respective hotspots as reference points;
   search the map for a plurality of recommendation facilities determined based on preferences of a target user of the terminal device; and
   when at least one of the search regions includes at least two of the recommendation facilities, generate a map of the at least one of the search regions as an area map by including at least one of a text or an image to distinguishably represent each of the at least two of the recommendation facilities from the recommendation facilities other than the at least two of the recommendation facilities, and
the terminal device is configured to control a display device to display the area map of the at least one of the search regions.

2. The area map provision system according to claim 1, wherein the server device is further configured to calculate a representative value of the concentration degrees determined at respective points on the map by statistically processing the concentration degrees, the concentration degrees at respective points on the map are successively determined, and the one of the terminal device or the server device is further configured to determine the point at which the concentration degree is equal to or higher than the threshold value and is also equal to or higher than a value that is greater than the representative value by a predetermined value, as one of the hotspots.

3. An area map provision system comprising:

a terminal device; and a server device communicating with the terminal device, wherein the server device is configured to:

collect a travel information related to a travel of each of a plurality of vehicles;

determine, based on the travel information, a concentration degree indicating a degree of a concentration of people at each of a plurality of points on a map; and calculate a representative value of the concentration degrees at respective points on the map by statistically processing the concentration degrees, the concentration degrees at respective points being successively determined, one of the terminal device or the server device is configured to:

determine a part of the points, each of which has the concentration degree equal to or higher than a threshold value and is also equal to or higher than a value that is greater than the representative value by a predetermined value, as a plurality of hotspots, a plurality of search regions being defined on the map with respective hotspots as reference points;

search the map for a plurality of recommendation facilities determined based on preferences of a target user of the terminal device; and when one of the search regions includes at least two of the recommendation facilities, generate a map of the one of the search regions by including at least one of a text or an image to distinguishably represent each of the at least two of the recommendation facilities from the recommendation facilities other than the at least two of the recommendation facilities, and the terminal device is configured to control a display device to display the area map of the one of the search regions.

4. The area map provision system according to claim 2, wherein the server device is further configured to calculate a plurality of the representative values corresponding to a plurality of time segments, respectively, and the one of the terminal device or the server device is further configured to determine the point at which the concentration degree is equal to or higher than the threshold value and is also equal to or higher than the value that is greater than one of the representative values by the predetermined value, as one of the hotspots, and the time segment during which the one of the representative values is calculated is identical to a time segment during which the concentration degree is determined.

5. The area map provision system according to claim 1, wherein a subject device, which is one of the terminal device or the server device, is further configured to store a plurality of famous facilities existing on the map, the one of the terminal device or the server device is further configured to search a plurality of facilities, which exist on the map and are classified as a plurality of predetermined types, other than the famous facilities for the recommendation facilities, the search regions, which are defined on the map with respective hotspots as the reference points, include a first search region and a second search region, and a quantity of the recommendation facilities included in the first search region is greater than a quantity of the recommendation facilities included in the second search region, and the one of the terminal device or the server device is further configured to select the first search region and generate the area map based on the first search region.

6. The area map provision system according to claim 1, wherein one of the terminal device or the server device is further configured to:

acquire an activity history of the target user; and estimate, based on the activity history of the target user, one or more facilities that suit the preferences of the target user from a plurality of facilities existing on the map, the one of the terminal device or the server device is further configured to:

search the facilities, which exist on the map and are classified as a plurality of predetermined types, other than the one or more facilities that are estimated for the recommendation facilities, the search regions, which are defined on the map with respective hotspots as the reference points, include a third search region and a fourth search region, and a quantity of the recommendation facilities included in the third search region is greater than a quantity of the recommendation facilities included in the fourth search region, and select the third search region and generate the area map based on the third search region.

7. The area map provision system according to claim 6, wherein the one of the terminal device or the server device is further configured to generate the area map by including at least one of the text or the image to distinguishably represent each of the recommendation facilities and the one or more facilities estimated from the facilities other than the recommendation facilities and the one or more facilities estimated.

8. The area map provision system according to claim 1, wherein the server device is further configured to collect an activity range information of the target user and an activity range information of a different user, the different user is a user of a different terminal device that is different from the terminal device, and an activity range of the target user is partially overlapped with an activity range of the different user in an overlap range, specify, based on the activity range information of the target user and the activity range information of the different user, a non-overlap range which is a remaining range of the overlap range in the activity range of the different user, and determine hotspots from the points included in the non-overlap range.

9. The area map provision system according to claim 8, wherein the server device is further configured to
collect a category specifying information used for specifying the target user and collect a category specifying information used for specifying the different user, and
specify, based on the category specifying information of the target user and the different user and the activity range information of the target user and the different user, the non-overlap range which is the remaining range of the overlap range in the activity range of the different user when a category of the target user is identical to a category of the different user.

10. The area map provision system according to claim 1, wherein
one of the terminal device or the server device is further configured to specify an activity range of the target user as a target user activity range, and
determine the hotspots from the points included in the target user activity range.

11. The area map provision system according to claim 1, wherein
one of the terminal device or the server device is further configured to specify a plurality of facilities corresponding to the hotspots, and
generate the area map by including at least one of the text or the image to distinguishably represent each of the recommendation facilities and the facilities specified from the facilities other than the recommendation facilities and the facilities specified.

12. The area map provision system according to claim 1, wherein
the terminal device is adapted to be used in one of the vehicles.

13. A terminal device being used as the terminal device of the area map provision system according to claim 1.

14. A server device being used as the server device of the area map provision system according to claim 1.

* * * * *